(12) United States Patent
Yu et al.

(10) Patent No.: US 8,989,315 B1
(45) Date of Patent: *Mar. 24, 2015

(54) METHODS, ALGORITHMS, SOFTWARE, CIRCUITS, ARCHITECTURES, AND SYSTEMS FOR IMPROVED COMMUNICATIONS OVER CYCLOSTATIONARY CHANNELS

(75) Inventors: Zhan Yu, Sunnyvale, CA (US);
Runsheng He, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 1436 days.

This patent is subject to a terminal disclaimer.

(21) Appl. No.: 12/709,428

(22) Filed: Feb. 19, 2010

Related U.S. Application Data (62) Division of application No. 10/896,161, filed on Jul. 20, 2004, now Pat. No. 7,675,979.

(51) Int. Cl.
*H04L 27/22* (2006.01)
*H04B 1/38* (2006.01)

(52) U.S. Cl.
USPC ............................. 375/326; 375/219; 375/330

(58) Field of Classification Search
USPC ................ 375/219, 220, 222, 224, 260, 261, 375/329–334, 324, 326; 340/3.1, 3.21, 340/310.11
See application file for complete search history.

(56) References Cited

U.S. PATENT DOCUMENTS

| | | | |
|---|---|---|---|
| 4,060,735 A * | 11/1977 | Pascucci et al. .................. 307/3 |
| 5,463,627 A * | 10/1995 | Matsuoka et al. ............ 370/350 |
| 6,233,075 B1 | 5/2001 | Chang et al. |
| 6,249,683 B1 | 6/2001 | Lundby et al. |
| 6,301,681 B1 | 10/2001 | Chen et al. |
| 6,477,277 B1 * | 11/2002 | Chippendale et al. ........ 382/232 |
| 6,754,238 B1 | 6/2004 | Lentine et al. |
| 6,950,460 B1 * | 9/2005 | Cappelletti et al. ........... 375/222 |
| 6,975,582 B1 * | 12/2005 | Karabinis et al. ............. 370/204 |
| 2002/0027893 A1 | 3/2002 | Alanara |
| 2004/0174851 A1 * | 9/2004 | Zalitzky et al. ............... 370/338 |
| 2004/0184427 A1 * | 9/2004 | Lynch et al. .................. 370/342 |
| 2005/0114489 A1 * | 5/2005 | Yonge et al. .................. 709/223 |
| 2006/0259843 A1 | 11/2006 | Welborn et al. |

FOREIGN PATENT DOCUMENTS

JP 2000-217101 A 4/2000

OTHER PUBLICATIONS

Jun Matsumoto, Hitoshi Nakawaga, Tetsuya Yamada, Junji Kumada: "Transmitter and Receiver for Interleave Transmission"; JP 2000-217101, Aug. 4, 2000, Patent Abstract and Drawing.

* cited by examiner

*Primary Examiner* — Young T. Tse (57) ABSTRACT

Methods, software, receivers and systems for communicating information over a cyclostationary channel. The method generally includes interleaving sections of a control sequence with bits of the information. The software and receivers are generally configured to implement one or more aspects of the methods disclosed herein, and the systems generally include those that embody the inventive receivers disclosed herein. The present invention is particularly useful in powerline channels, where certain parameters (such as noise) have time-dependent or periodic variations in value. By distributing the control sequence, the incidence of carrier recovery is reduced, the likelihood of successful packet or frame transmissions is increased, and data may be more reliably communicated.

17 Claims, 9 Drawing Sheets

METHODS, ALGORITHMS, SOFTWARE, CIRCUITS, ARCHITECTURES, AND SYSTEMS FOR IMPROVED COMMUNICATIONS OVER CYCLOSTATIONARY CHANNELS

RELATED APPLICATIONS

This application is a divisional of U.S. patent application Ser. No. 10/896,161, filed Jul. 20, 2004, incorporated herein by reference in its entirety.

FIELD OF THE INVENTION

The present invention generally relates to the field of communications (e.g., information transmissions). More specifically, embodiments of the present invention pertain to methods, algorithms, software, circuits, architectures, and systems for information transmissions over channels that have time-dependant or periodic fluctuations.

DISCUSSION OF THE BACKGROUND

Communications systems or networks generally comprise channels for sending and receiving data, audio and/or video information. A number of wired communications systems or networks, such as cable, Ethernet and Gigabit Ethernet systems, generally include stationary channels. A stationary channel is generally one in which the channel response and the noise statistics do not vary significantly or regularly (if at all) over time. Techniques are available for such systems and networks to reduce the adverse effects of random and/or systematic fluctuations in communications parameters. However, such techniques generally do not affect communications parameters that tend to fluctuate over time.

Certain communications systems or networks, such as powerline systems or networks, include cyclostationary channels. A cyclostationary channel is one in which the channel response, the noise statistics and/or channel attenuation vary periodically. Also, powerline channels, which use conventional AC power lines for communications, experience regular fluctuations in noise and signal attenuation. The period of the noise power function in a powerline channel is generally the inverse of twice its frequency. In a typical case, that period is ($1/120$ Hz), or 8.3 msec. Noise in a powerline channel may also be introduced by other sources. During "spikes" in the noise power in a powerline channel, the signal-to-noise ratio (SNR) can be reduced sufficiently to cause errors in the data. Particularly when the signal strength is low, a low SNR can cause significant reliability problems.

Figure 1:
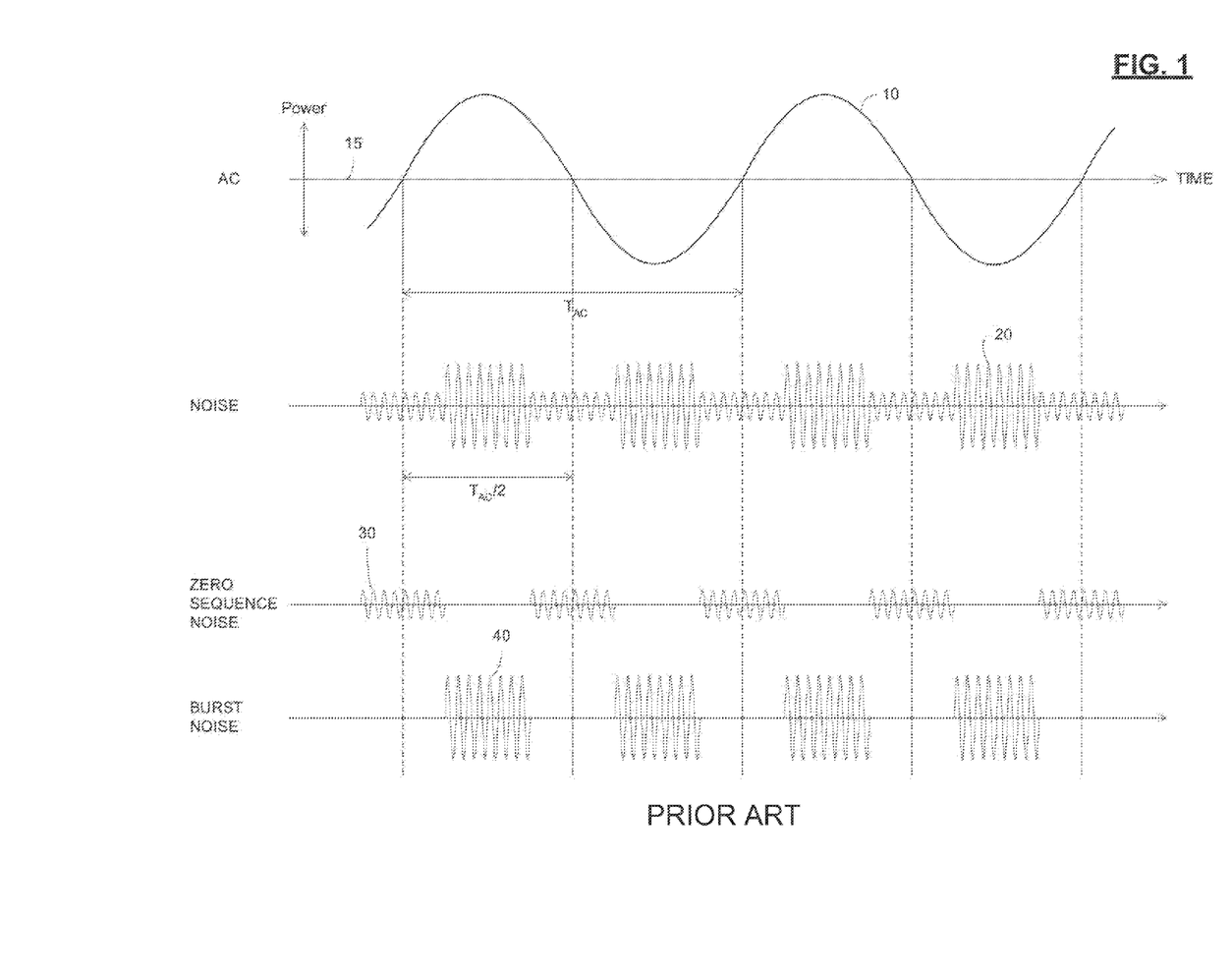
FIG. 1 is a diagram showing various powerline waveforms.

Referring now to FIG. 1, the powerline transmits a 60 Hz or 50 Hz sinusoidal power signal 10 supplying AC. The noise 20 in power lines may change within a period $T_{AC}$ or $T_{AC}/2$, where $T_{AC}$ is the duration of one cycle of the AC power supply and/or voltage, typically $1/60$ or $1/50$ seconds (see, e.g., "Modeling of Cyclostationary and Frequency Dependent Power-Line Channels for Communications," by Katayama et al.). As shown in FIG. 1, under common normal operating conditions, powerline channel noise 20 typically comprises a "zero power" component 30 (representative of the noise in the channel at the points where the AC power curve 10 crosses the zero power axis 15) and a burst noise component 40 (representative of the noise in the channel where the AC power curve 10 is at or near its maximum value[s]), although noise in cyclostationary channels may vary, depending upon operating conditions, equipment, power supply variations, etc. Thus, under normal operating conditions, cyclostationary channel noise 20 may be somewhat related to the absolute value of the AC power signal 10.

Figure 2:
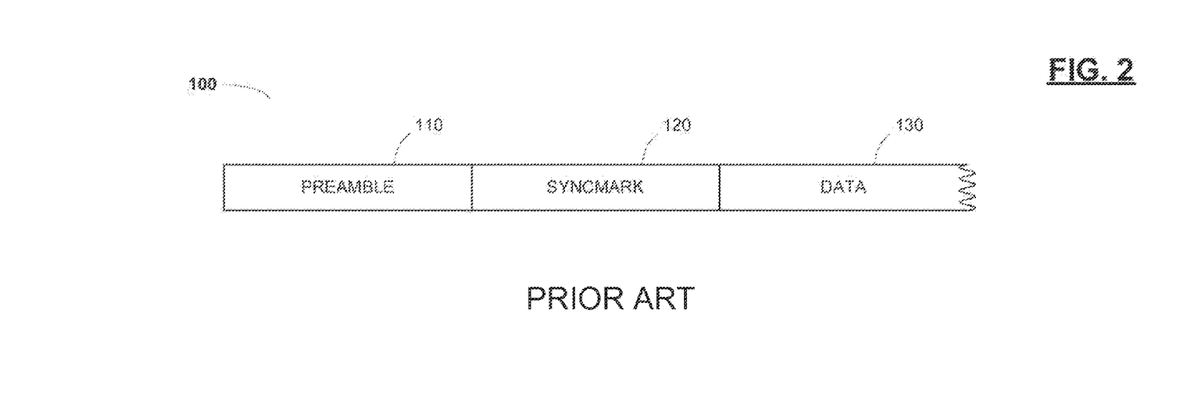
FIG. 2 is a diagram showing a conventional data communication packet format.

A typical packet 100 for burst mode transmission is shown in FIG. 2. The packet 100 typically comprises a preamble 110, a synchronization sequence (or "syncmark") 120, and data 130. The synchronization sequence 120 is used during frame synchronization. Under burst noise, especially cyclostationary burst noise, there is a relatively high probability that bits in the synchronization sequence 120 may be corrupted. For 10 Kb/s DBPSK modulation (0.1 ms/bit), if the cyclostationary noise has a burst length of half of its cycle (i.e., half of $T_{AC}/2=4.15$ ms for 60 Hz AC power), about 42 bits could be corrupted by cyclostationary burst noise. This implies that the synchronization sequence 120 should be longer, and perhaps significantly longer, than 42 bits.

In systems without burst noise, the preamble 110 is often a 010101 sequence, and it is often used in carrier recovery. Due to the long, cyclostationary burst noise on the powerline, it is possible that the entire preamble 110 can be corrupted by burst noise, which means a very long preamble (e.g., more than 4.2 ms, or 42 bits at a 10 Kb/s rate) is desirable in a 60 Hz powerline channel to improve the success rate in carrier recovery. However, it is naturally desirable to minimize the number of bits dedicated to non-data (e.g., control and/or identification) functions, particularly over a sometimes noisy and/or problematic medium such as power lines. In some applications (e.g., voice transmissions), one might wish to completely avoid transmitting information during periods of high noise, and thus, one might keep the packet length small to fit packets into the "low noise" periods on the power line.

A need therefore exists to improve communications in channels in which time-dependant fluctuations are a potential source of error or corruption, in order to reduce errors, reduce shutdowns, increase the success rate of such communications and/or increase communications uptime in networks that include such channels.

SUMMARY OF THE INVENTION

Embodiments of the present invention relate to methods, algorithms, software, circuitry (e.g., receivers), architectures, and systems for improving communications (particularly data communications) over channels having time-dependant or periodic fluctuations. The method of communicating information generally comprises the steps of (a) interleaving a plurality of sections of a control sequence with bits of the information; and (b) transmitting the interleaved control sequence sections and the information over a channel having periodically recurring and/or time-dependent parameter fluctuations. The method of receiving and/or processing information generally comprises the steps of (1) receiving a block of information from a channel having periodically recurring and/or time-dependent parameter fluctuations, the block of information further comprising a plurality of interleaved sections of a control sequence; (2) identifying the interleaved synchronization mark sections; and (3) processing the block of information. The algorithms and/or software are generally configured to implement one or more aspects of the inventive methods disclosed herein.

In one embodiment, the receiver circuitry and/or architecture generally comprise (A) a recovery circuit configured to recover an information signal from a channel; (B) a channel parameter monitor configured to determine, directly or indirectly, a value for a first parameter of the first channel, the first parameter having one or more periodically recurring and/or time-dependant fluctuations; and (C) logic configured to process the recovered information signal in a manner dependent on the first parameter value. In another embodiment, the receiver circuitry and/or architecture generally comprise (i) a recovery circuit configured to recover an information signal from a channel having one or more periodically recurring and/or time-dependant parameter fluctuations; (ii) a storage circuit configured to store a control sequence pattern comprising a plurality of interleaved sections; and (iii) logic configured to identify the control sequence pattern in the information signal. The systems generally comprise those that include a circuit and/or architecture embodying one or more of the inventive concepts disclosed herein.

The present invention advantageously provides improved reliability in data communications. The present invention is particularly useful in cyclostationary channels, such as powerline channels, where certain parameters have time-dependent or periodic variations in value. These and other advantages of the present invention will become readily apparent from the detailed description of preferred embodiments below.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of processes, procedures, logic blocks, functional blocks, processing, and other symbolic representations of operations on data bits, data streams or waveforms within a computer, processor, controller and/or memory. These descriptions and representations are generally used by those skilled in the data processing arts to effectively convey the substance of their work to others skilled in the art. A process, procedure, logic block, function, operation, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like.

It should be borne in mind, however, that all of these and similar terms are associated with the appropriate physical quantities and are merely convenient labels applied to these quantities. Unless specifically stated otherwise and/or as is apparent from the following discussions, it is appreciated that throughout the present application, discussions utilizing terms such as "processing," "operating," "computing," "calculating," "determining," "manipulating," "transforming," "displaying" or the like, refer to the action and processes of a computer or data processing system, or similar processing device (e.g., an electrical, optical, or quantum computing or processing logic, circuit or device), that manipulates and transforms data represented as physical (e.g., electronic) quantities. The terms refer to actions, operations and/or processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture.

Furthermore, for the sake of convenience and simplicity, the terms "clock," "time," "rate," "period" and "frequency" are generally used interchangeably herein and are generally given their art-recognized meanings, but use of any one of these terms will generally indicate the suitability of any of the other of these terms. Also, for convenience and simplicity, the terms "data," "data stream," "waveform" and "information" may be used interchangeably, as may the terms "mark" and "tag" (and grammatical variations thereof), and the terms "connected to," "coupled with," "coupled to," and "in communication with" (any of which may be direct or indirect).

In the present disclosure, except where the context clearly indicates another meaning, the terms "distribute" and "interleave" (and grammatical variations thereof) are used interchangeably, and use of one of these terms will generally indicate the suitability of the other. In addition, the terms "packet" and "frame" are also used interchangeably, and use of one term will generally indicate the suitability of the other, although these two terms are generally given their art-recognized meanings. The term "adjacent" has its art-recognized meaning, but the term "proximate" means close or nearby, and includes (but is not limited to) "adjacent."

The present invention concerns methods, software, receivers and systems for communicating information over a cyclostationary channel (e.g., that has periodically recurring and/or time-dependant processing and/or parameter fluctuations). The method of communicating information generally comprises the steps of (a) interleaving a plurality of sections of a control sequence with bits of the information; and (b) transmitting the interleaved control sequence sections and the information over a channel having periodically recurring and/or time-dependent parameter fluctuations. The method of receiving and/or processing information generally comprises the steps of (1) receiving a block of information from a channel having one or more periodically recurring and/or time-dependent parameter fluctuations, the block of information further comprising a plurality of interleaved sections of a control sequence; (2) identifying the interleaved synchronization mark sections; and (3) processing the block of information. The algorithms and/or software are generally configured to implement one or more aspects of the inventive methods disclosed herein.

In one embodiment, the receiver circuitry and/or architecture generally comprise (A) a recovery circuit configured to recover an information signal from a channel; (B) a channel parameter monitor configured to determine, directly or indirectly, a value for a channel parameter having periodically recurring and/or time-dependant fluctuations; and (C) logic configured to process the recovered information signal in a manner dependent on the channel parameter value. In another embodiment, the receiver circuitry and/or architecture generally comprise (i) a recovery circuit configured to recover an information signal from a channel having one or more periodically recurring and/or time-dependant parameter fluctuations; (ii) a storage circuit configured to store a control sequence pattern comprising a plurality of interleaved sections; and (iii) logic configured to identify the control sequence pattern in the information signal. The systems generally comprise those that include a circuit and/or architecture embodying one or more of the inventive concepts disclosed herein.

The periodically recurring and/or time-dependent parameters (hereinafter simplified as "time-dependent parameters") for which the present invention is applicable include noise parameters (such as harmonic noise of nearly any kind, and in nearly any kind of channel), power parameters (such as signal modulation, channel attenuation and/or power factor control parameters), and others (such as zero sequence current). Thus, the time-dependent parameter in the present invention is not limited to noise power in a powerline channel. The invention, in its various aspects, will be explained in greater detail below with regard to exemplary embodiments.

Exemplary Methods of Transmitting a Block of Information Over a Cyclostationary Channel In one aspect, the present invention relates to methods for processing information transmissions over a channel having time-dependent and/or periodic parameter fluctuations. In one sub-aspect related to sending information over the channel, the method comprises the steps of interleaving a plurality of sections of a control sequence with bits of the information, and transmitting the interleaved control sequence sections and the block of information over the channel. In another sub-aspect related to receiving the transmission, the method comprises the steps of receiving the block of information from the channel, the block of information further comprising a plurality of interleaved sections of a control sequence; identifying the interleaved control sequence sections; and processing the block of information.

In a preferred embodiment, the channel comprises a cyclostationary channel, and the time-dependent parameter may comprise a noise parameter, an energy parameter, a power parameter, or an attenuation parameter. However, referring back to FIG. 1, burst noise is a significant source of potential error in a cyclostationary channel, such as a powerline channel, and the present invention is particularly suited for improving the reliability of information transmissions over cyclostationary channels where burst noise can mask (or otherwise render unreliable) relatively short sequences of information, such as control sequences in a packet or frame.

Figure 3:
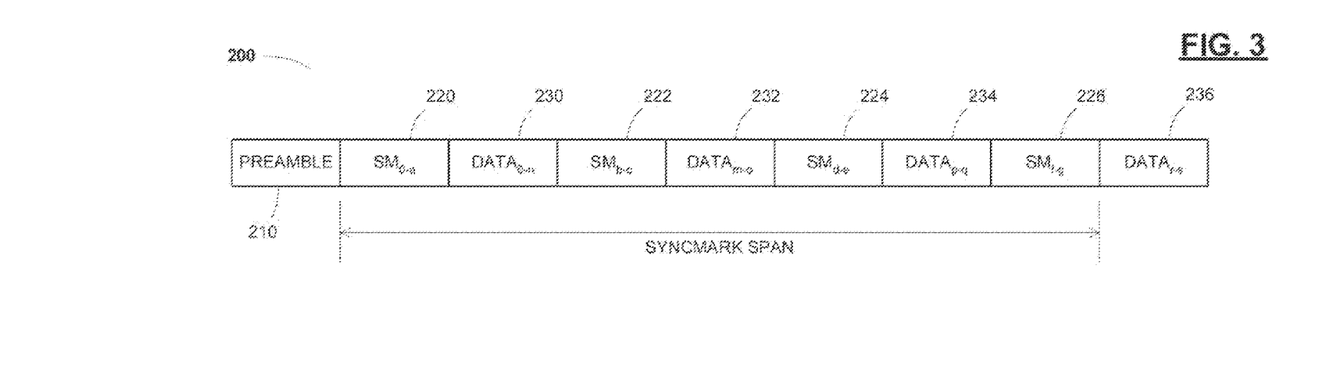
FIG. 3 is a diagram showing an exemplary data communication packet format according to the present invention.

FIG. 3 shows an exemplary architecture for a block of information 200 to be communicated according to the present invention. The information may comprise data, audio (voice) and/or video information. In one embodiment, the information comprises data, and in various implementations, the block of information comprises a data packet or a frame comprising data. However, for convenience and simplicity, the terms "data" and "information" will be used interchangeably herein.

Exemplary information block 200 generally comprises a preamble 210, a plurality of control sequence sections 220, 222, 224 and 226, interleaved data 230, 232 and 234, and terminal (typically bulk) information portion or segment 236. In the example of FIG. 3, the control sequence 220-226 comprises a synchronization sequence or mark ("SYNC-MARK"), but in general, it may comprise any control sequence conventionally used in information communications, such as a preamble, a header sequence, a start-of-frame sequence, a start-of-packet sequence (which may be equivalent to and/or interchangeable with the synchronization mark or sequence), address information (such as source or destination information), encryption information, an error checking sequence (such as CRC code or Hamming code) or an identification sequence.

Continuing to refer to FIG. 3, the exemplary control sequence comprises first control sequence section 220 ("$SM_{0-a}$"), second control sequence section 222 ("$SM_{b-c}$"), third control sequence section 224 ("$SM_{d-e}$") and fourth control sequence section 226 ("$SM_{f-g}$"). While four such sections are shown, the control sequence can be divided into any integer number of sections of two or more, up to the number of bits in the control sequence. Thus, the control sequence generally has a length of n bits and comprises m sections, where each of n and m are independently an integer of at least 2, and n≥m.

Also, the length of each control section can be independent of the other sections' lengths. In other words, each of the sections of the control sequence independently has a length of from 1 to (n−m) bits. For example, assuming each control sequence section 220, 222 224 and 226 in FIG. 3 has a length of at least two bits, "a" in $SM_{0-a}$ 220 can be any integer of from 1 to (g−1), where g is the last bit position of the final control sequence section $SM_{f-g}$ 226 and g=(n−1). The differences c−b in $SM_{b-c}$ 222 (b=a+1), e−d in $SM_{d-e}$ 224 (d=c+1), and g−f in $SM_{f-g}$ 226 (f=e+1) can independently be any integer of from 0 to (n−m−1), as long as (a+c+e+g−b−d−f+4)=n. In one embodiment, each control sequence section has a length as close to the lengths of the other sections as is possible (i.e., a length of n/m when n is an integer multiple of m, or a length of a nearest integer to n/m when n is not an integer multiple of m). In one implementation, each control sequence section has a length of two bits (unless the control sequence has an odd number of bits, in which case the last section has a length of one bit). Thus, where n is an even integer of at least 4, m may be an integer of from 2 to (n/2), and each of the control sequence section lengths is independently from 2 to (n/2) bits. Alternatively, where n is an odd integer of at least 5, m may be an integer of from 2 to ((n−1)/2), and each of the control sequence section lengths is independently from 2 to ((n+1)/2) bits.

Where the control sequence comprises or consists of a synchronization mark, the synchronization mark may have a length of at least 4 or 6 bits and/or up to 20, 30 or 40 bits. In one implementation, the synchronization mark has a length of 10 bits (g=9 in $SM_{f-g}$). Thus, "a" in $SM_{0-a}$ 220 may be 1 or 2; b and c in $SM_{b-c}$ 222 may be 2 or 3 and 3, 4 or 5, respectively; d and e in $SM_{d-e}$ 224, may be 4, 5 or 6 and 5, 6 or 7, respectively; and fin $SM_{f-g}$ 226 may be 7 or 8.

Interleaved data segments or portions 230, 232 and 234 generally have a length that is selected such that transmission of the combined control sequence sections 220-226 and interleaved data segments 230-234 takes longer that $T_{AC}/2$ (as defined above). Generally, interleaved data segments 230-234 have a length about the same as or greater than those of the corresponding control sequence sections 220-226. For example, each interleaved data segment may independently have a length of from 2, 4 or 6 bits to 10, 20, 40 or 100 bits. Terminal information segment 236 typically comprises the bulk of the non-control information in block 200, usually at least half of such non-control information and frequently as much as 70%, 80%, 90% or more of such non-control information.

As shown in the exemplary embodiment of FIG. 3, the block of information 200 may further comprise a preamble 210, in which case the method further comprises transmitting the preamble. Certain implementations may use phase shift keying (e.g., quadrature PSK) and/or differential modulation (DBPSK, for example) to avoid carrier recovery (see, e.g., Proakis, J., "Digital Communications," McGraw-Hill Companies, Inc. [2000]). Therefore, a very short preamble (e.g., from 4 to 10 bits, and in one implementation, 6 bits) may be used. However, other modulation techniques, such as amplitude modulation and code shift keying (each of which may be differential), may also be employed.

While the present method of sending information is not limited by the rate at which the information is sent, transmitting may be conducted at a rate of at least about 5 KHz or about 10 KHz, up to about 1 MHz, about 10 MHz, about 100 MHz, about 1 GHz, about 2.5 GHz, or even about 5 GHz. However, in the case of powerline channels, where the standard AC frequency is generally about 50 Hz or 60 Hz, the time-dependent parameter fluctuations generally have a period of no more than $T_{AC}/2$, or about 8.3 msec (in the case of 60 Hz AC power) or about 10 msec (in the case of 50 Hz AC power). Thus, as described above, sections of the control sequence may be interleaved with bits of the information over a period of time of at least $T_{AC}/2$, or about 8.3 msec to about 10 msec in a powerline channel.

However, as shown in FIG. 1, the time-dependent noise fluctuations in a powerline channel have a minimum period of $T_{AC}/2$, but burst noise signal 40 has a length that is smaller than $T_{AC}/2$. Due to variations in operating conditions (e.g., fluctuations in power supply, signal processing, etc.), the length of burst noise 40 may be characterized as a fraction of $T_{AC}$ smaller than that of the time-dependent noise fluctuations (e.g., from about $T_{AC}/6$ to about $T_{AC}/3$, and in one embodiment, about $T_{AC}/4$). Thus, in further embodiments of the present invention, sections of the control sequence may be interleaved with bits of the information over a period of time of at least about 8.3 msec, 5.6 msec, 4.2 msec or 2.8 msec in the case of 60 Hz AC power, and about 10 msec, 6.7 msec, 5 msec or 3.3 msec in the case of 50 Hz AC power. By interleaving sections of the control sequence during at least a substantial portion of the time-dependent parameter fluctuation function (e.g., burst noise function 40), at least some part of the control sequence is likely to be transmitted during a period when that channel parameter is at a relatively low value.

Exemplary Methods of Receiving a Block of Information from a Cyclostationary Channel In an aspect of the invention related to receiving a block of information from a channel having time-dependent parameter fluctuations, the method generally comprises the steps of: receiving the block of information from the channel; identifying the interleaved synchronization mark sections; and processing the block of information. As for the method of transmitting, the block of information comprises a plurality of interleaved sections of a control sequence, and/or the information may comprise data or audio and/or visual (video or still) information. In various embodiments, the block of information comprises a data packet or frame comprising data, and/or the control sequence comprises a synchronization mark. In the latter embodiment, the method further comprises the steps of identifying the synchronization mark, and synchronizing a first bit of the block of information to a predetermined reference (i.e., a known value or sequence for the control sequence).

In one embodiment, the method of receiving information further comprises the step of searching for the interleaved sections of the control sequence in response to transmission energy in the channel exceeding a predetermined threshold energy. Thus, the method may also further comprise (i) determining and/or calculating a channel transmission energy, and/or (ii) comparing a channel transmission energy with a threshold energy.

Figure 4:
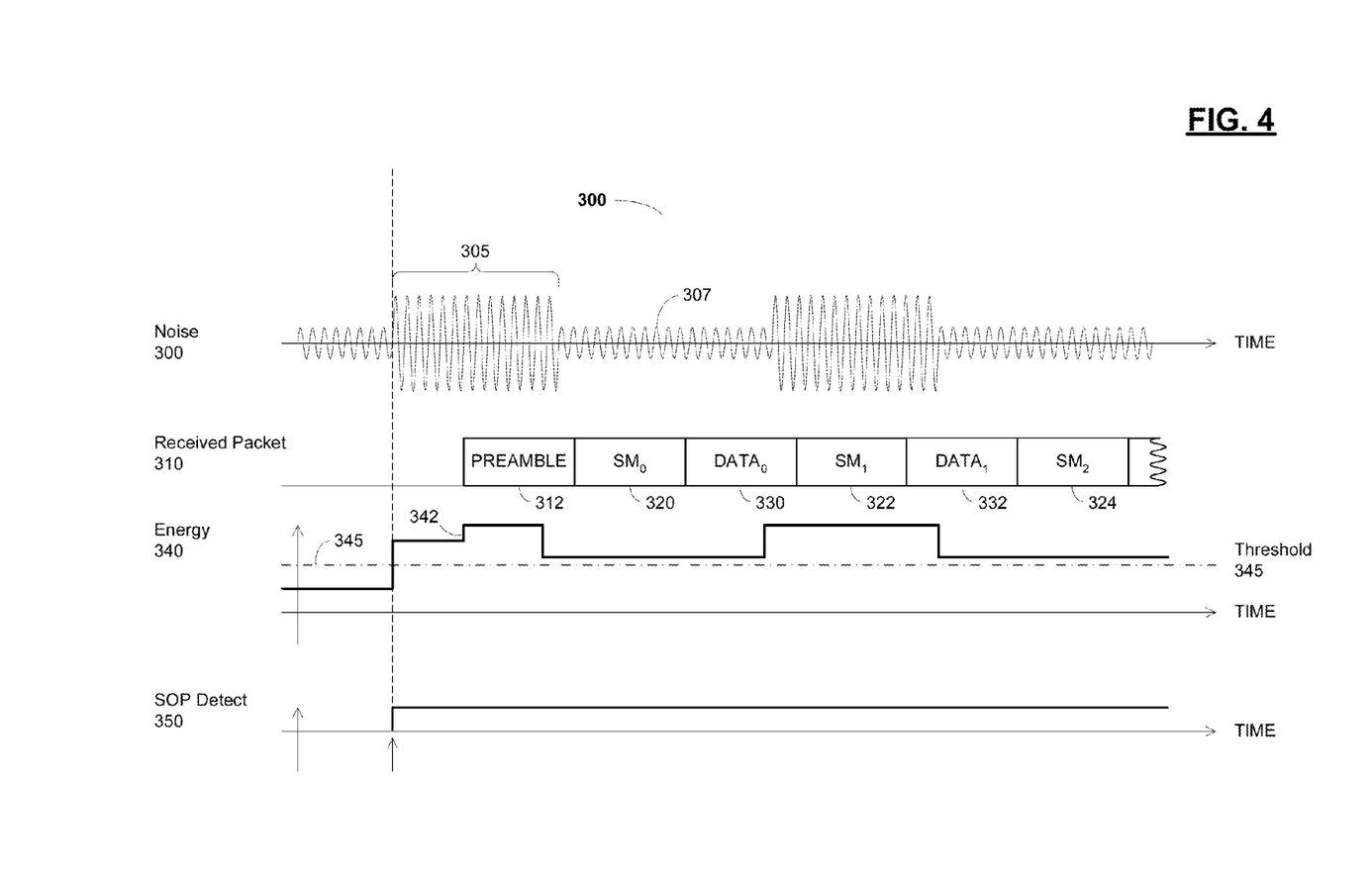
FIG. 4 is a diagram showing a powerline burst noise waveform, a portion of an exemplary powerline packet format according to the present invention, and waveforms at certain nodes in the circuit of FIG. 7.

FIG. 4 shows an exemplary "threshold channel energy" control sequence searching embodiment. Channel noise 300 varies or fluctuates regularly as a function of time, as is known, for example, in powerline channels. A packet 310, comprising preamble 312, synchronization mark sequence sections $SM_0$ 320, $SM_1$ 322 and $SM_2$ 324, and interleaved data segments 330 and 332, is received from the channel. However, the first bit of preamble 312 is received during a burst noise maximum 305, thus increasing channel transmission energy 340 by a relatively small increment 342 at a relatively high range of values. Such a transition can be difficult to detect using technology in existence prior to the present invention.

The "threshold channel energy" control sequence searching embodiment of the present invention avoids the difficulties associated with trying to detect a relatively small increase in channel transmission energy at relatively high energies. Instead, one determines or calculates the total channel transmission energy 340 (using known techniques and circuits), compares the transmission energy 340 with a predetermined threshold energy 345, then initiates a search for the interleaved sections 320, 322 and 324 of the control sequence when the transmission energy 340 exceeds a predetermined threshold energy 345. The search may be initiated by asserting a synchronization mark or start-of-packet ("SOP") search or detection enable signal, such as "SOP Detect" signal 350, which essentially activates logic and/or circuitry that searches for (or attempts to detect) the sections 320, 322 and 324 of the control sequence.

In the example of FIG. 4, after burst noise maximum 305, transmission energy 340 (which is representative of zero sequence noise 307 and packet 310) decreases to a value slightly greater than threshold energy 345. Thus, the example of FIG. 4 will also search for the control sequence sections in response to receiving the information block when the time-dependent channel parameter fluctuation is at a relative absolute minimum. However, one may select a different threshold energy for initiating detection of the control sequence, as may be empirically determined in accordance with techniques known to those skilled in the art.

Figure 5:
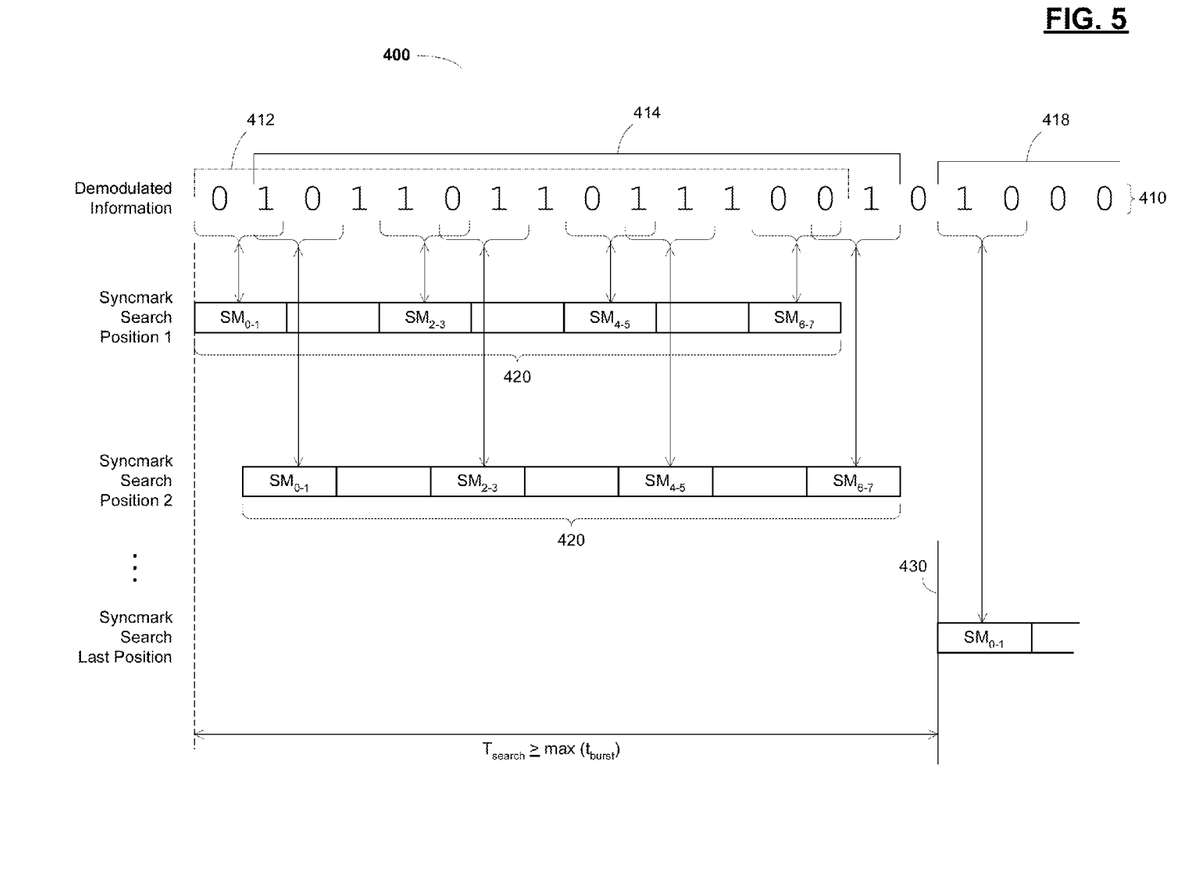
FIG. 5 is a diagram showing an exemplary synchronization mark detection scheme according to the present invention.

FIG. 5 shows a set of exemplary waveforms for the present control sequence searching and/or detection scheme. As described above with respect to FIG. 4, one may detect the packet arrival by detecting a transmission band energy increase, but the transmission band energy could also increase due to burst noise. Therefore, the search range for the control sequence may be extended to encompass both possibilities for transmission band energy increases, a technique that can be designated "extended frame search range" for convenience.

Referring back to FIG. 5, for each search location (corresponding to each bit, in order, in demodulated information stream 410), one may compare (or cross-correlate) the received bit stream 410 with the reference control sequence (e.g., syncmark pattern 420). (As is understood by those skilled in the art, the received and/or demodulated information may be in the form of a single-ended or differential analog waveform, and such received and/or demodulated information may be sampled according to known techniques to generate or produce a corresponding bit stream comprising discrete units of data having one of a plurality of digital logic levels.) For example, one may calculate a correlation coefficient for a first sequence 412 of bit stream 410 (e.g., starting at search position 1) having the same length as the combined control sequence sections and interleaved data. The correlation coefficient is generally calculated using only the bit positions corresponding to the control sequence (e.g., syncmark) sections $SM_{0-1}$ 422, $SM_{2-3}$ 424, $SM_{4-5}$ 426 and $SM_{0-1}$ 428, as shown in FIG. 5. While FIG. 5 shows a synchronization mark having a length of eight bits, divided evenly into four sections and interleaved with data segments of two bits each, one may use any type of control sequence having nearly any length, divided into nearly any number of sections (but not to exceed the number of bits in the control sequence), and interleaved with data segments of any appropriate length (e.g., as discussed above).

This correlation coefficient calculation may be repeated for the next position of bit stream 410 (e.g., using second sequence 414), then for each successive position of bit stream 410 up to the sequence 418 at the last position of bit stream 410 (defined as that position occurring at the end of a search period $T_{search}$ 430). The sequence having a minimum correlation distance (e.g., a minimum Hamming or Euclidean distance) may then be selected to identify the location of the control sequence. Thus, in further embodiments, the searching step may comprise calculating a correlation coefficient and/or a minimum correlation distance between (1) the interleaved sections of the control sequence and (2) the received information. While the minimum correlation distance calculation is largely conventional, a Hamming distance calculation may be preferred in certain implementations. In the example of FIG. 5, $T_{search}$ 430 is longer than the maximum length of the burst noise, which generally is considered to be half of $T_{AC}/2$.

A further embodiment of the invention relates to use of an adjacent reference band to mark bits that are received when the time-dependent parameter fluctuations exceed a predetermined and/or threshold value. In cyclostationary channels such as powerline channels, proximate or adjacent frequency bands often have cyclostationary parameters (such as burst noise) with characteristics similar to those of the band in which information is being received. For example, if one receives a channel transmission at 10 KHz, one can monitor channel noise at 5 KHz, 15 KHz or 20 KHz and get a reasonably reliable and/or accurate estimate of the channel noise at 10 KHz. Similarly, if one receives a channel transmission in the 250-300 KHz band, one can monitor channel noise in 200-250 KHz or 300-350 KHz bands and get a reasonable estimate of the channel noise value in the 250-300 KHz band. Therefore, one can indirectly determine or detect such parameter excursions in a transmission band by observing or monitoring the same parameter in a proximate or adjacent frequency band.

Thus, the present method may further comprise comparing a transmission energy from a second band of the channel (or even a second, structurally and/or functionally similar or identical channel) with a threshold energy, the second band or channel being proximate to the first band or channel, and having at least one substantially similar time-dependent parameter fluctuation to those of the first band or channel. In various embodiments, the parameter being monitored or observed is transmission energy and/or noise (e.g., burst noise).

An even further embodiment of the invention relates to use of a reference band (or channel) parameter marker as an erasure indicator (or "tag"). For example, when the energy in the reference band is over a certain threshold level, one may expect similar or substantially the same noise in the transmission band. Therefore, when the energy in the reference band is over a certain threshold level, one can mark or "tag" the bits transmitted at the same time over the transmission channel as un-reliable bits. For control sequence (e.g., syncmark) search and comparison, the marked bits can be ignored, and the bit stream sequence starting at the position with the largest number of matched, unmarked bits relative to the reference control sequence can be selected as the initial control sequence location. Thus, the present method may further comprise the step(s) of (i) marking bits received from the first band or channel as unreliable when the transmission energy from the second band or channel exceeds the threshold energy; and/or (ii) identifying the interleaved sections of the control sequence from unmarked bits in the information received from the first band or channel.

Figure 6:
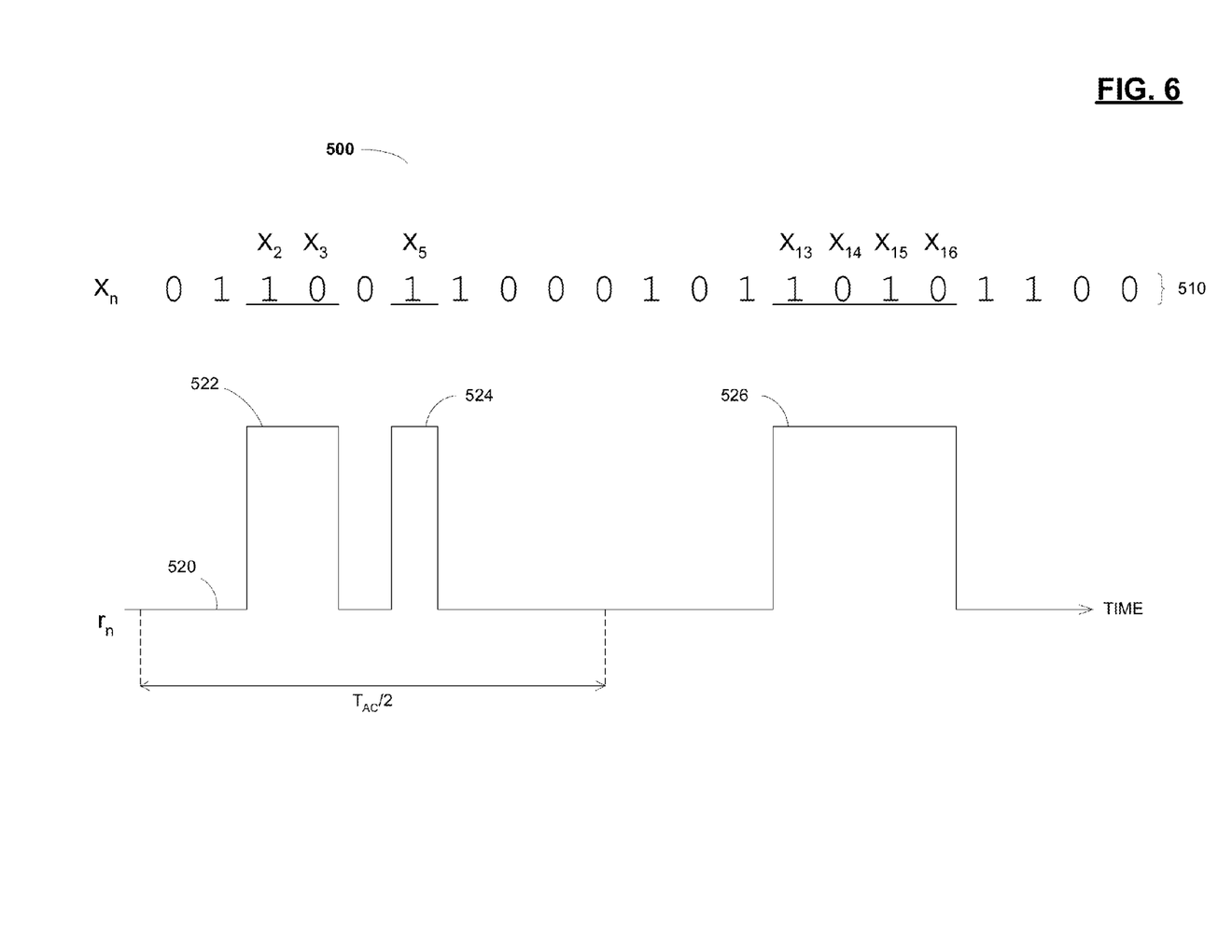
FIG. 6 is a diagram showing an exemplary "mark and omit" scheme according to the present invention for improving the reliability of synchronization mark detection.

FIG. 6 shows a set of exemplary waveforms for the present "bit marking" scheme 500. For example, a bit stream 510 is received from a first frequency band of a cyclostationary (e.g., powerline) channel. A noise or transmission energy parameter of a second frequency band of the cyclostationary channel adjacent to the first frequency band is monitored and compared to a threshold energy level to produce a marking waveform $r_a$ 520. When the noise or transmission energy of the second frequency band exceeds the threshold energy level, marking waveform $r_a$ 520 changes state to an active bit marking logic level 522, 524 and 526 at bit positions $X_2$, $X_3$, $X_5$ and $X_{13}$-$X_{16}$. Thus, the bits in bit stream 510 at positions $X_2$, $X_3$, $X_5$ and $X_{13}$-$X_{16}$ will be marked as unreliable and will be ignored in any subsequent control sequence search, calculation and/or determination.

Exemplary Software

The present invention also includes algorithms, computer program(s) and/or software, implementable and/or executable in a general purpose computer or workstation equipped with a conventional digital signal processor, configured to perform one or more steps of the method and/or one or more operations of the hardware. Thus, a further aspect of the invention relates to algorithms and/or software that implement the above method(s). For example, the invention may further relate to a computer program, computer-readable medium or waveform containing a set of instructions which, when executed by an appropriate signal processing device, is configured to perform the above-described method and/or algorithm.

For example, the computer-readable medium may comprise any medium that can be read by a signal processing device configured to read the medium and execute code stored thereon or therein, such as a floppy disk, CD-ROM, magnetic tape or hard disk drive. Such code may comprise object code, source code and/or binary code.

The waveform is generally configured for transmission through an appropriate medium, such as copper wire, a conventional twisted pair wireline, a conventional network cable, a conventional optical data transmission cable, or even air or a vacuum (e.g., outer space) for wireless signal transmissions. The waveform and/or code for implementing the present method(s) are generally digital, and are generally configured for processing by a conventional digital data processor (e.g., a microprocessor, microcontroller, or logic circuit such as a programmable gate array, programmable logic circuit/device or application-specific [integrated] circuit).

In various embodiments, the present computer-readable medium or waveform may be adapted so that the block of information comprises (i) a preamble (optional) and (ii) a data packet or frame comprising data, and/or the control sequence comprises a synchronization mark, a header sequence, a start-of-frame sequence, a start-of-packet sequence, address information, encryption information, an error checking sequence or an identification sequence. In certain implementations, the control sequence comprises a synchronization mark and may further comprise a preamble. Thus, the instructions in the present computer-readable medium or waveform may be configured to perform the step of placing a preamble before the first control sequence section.

The set of instructions in the present computer-readable medium or waveform may further comprise a first instruction to place a first control sequence section before a bulk portion of the information, a second instruction to place a first group of the information bits after the first control sequence and before the bulk portion of the information, and a third instruction to place a second control sequence section after the first group of the information bits and before the bulk portion of the information. In further embodiments, the set of instructions further comprises a fourth instruction to place a second group of the information bits after the second control sequence and before the bulk portion of the information, and a fifth instruction to place a third control sequence section after the second group of the information bits and before the bulk portion of the information. As one can see, the number of additional instructions to place additional groups of information bits and control sequence section can increase to essentially any number, depending on the number of control sequence sections.

The present computer-readable medium or waveform may include certain boundaries on the control sequence and interleaved data. For example, the control sequence may have a length of n bits and may comprise m sections, where each of n and m are independently an integer of at least 2, $n \geq m$, and each of the sections of the control sequence independently has a length of from 1 to (n−m) bits. In one embodiment, n is an even integer of at least 4, m is an integer of from 2 to (n/2), and each of the control sequence section lengths is independently from 2 to (n/2) bits. Alternatively, n may be an odd integer of at least 5, m is an integer of from 2 to ((n−1)/2), and each of the control sequence section lengths is independently from 2 to ((n+1)12) bits. In other embodiments, $4 \leq n \leq 40$, $6 \leq n \leq 30$, or $8 \leq n \leq 20$, similar to the discussion above of certain control sequence length variations. Furthermore, the interleaved bits of information generally comprise (m−1) groups of the information bits, where each group independently has a length of up to p bits, wherein p is an integer of at least 2 and less than n (or any range of values between 2 and n).

With regard to the present method for receiving information from a channel having one or more time-dependent parameter fluctuations, the computer-readable medium or waveform may contain a set of instructions that further comprises at least one instruction to synchronize a first bit of the block of information to a predetermined reference. The predetermined reference may be a predetermined point in time, a predetermined transition or logic level of a (reference) clock signal, or a first cycle of a counter configured to count the received bits of information.

The set of instructions relating to the present method for receiving information may also further comprise (i) at least one instruction to search for (A) the control sequence (or a first control sequence section) at a first bit position of the received information and (B) the control sequence (or a second control sequence section) at a second bit position of the received information; (ii) a subset of instructions configured to compare or match a first control sequence section to a first reference sequence section at each of the first and second bit positions and compare or match a second control sequence section to a second reference sequence section, where a first group of information bits of known length is interposed between the first and second control sequence sections; and/or (iii) an instruction to search for a preamble in the received information before the first control sequence section. In further embodiments, the set of instructions further comprises (iv) a third instruction to search for a third control sequence section after a second group of the information bits interposed between the second control sequence section and the third control sequence section, and/or (v) an instruction to configured to compare or match a third control sequence section to a third reference sequence section, where a second group of information bits of known length is interposed between the second and third control sequence sections. Of course, the (sub)set of instructions to search, compare and/or match can be increased to correspond to the number of control sequence sections.

In even further embodiments, the present computer-readable medium or waveform may further include (i) at least one instruction to calculate a correlation coefficient (e.g., a minimum Hamming distance) for each bit position in an information stream received during a control sequence search period, (ii) at least one instruction to compare bit positions in the information corresponding to the first and second control sequence sections with a reference sequence, and/or (iii) at least one instruction to select the sequence at a bit position having the largest number of bits matching the reference sequence (or having the highest correlation coefficient or the lowest minimum correlation distance) as the initial position of the control sequence.

Exemplary Circuits and Architectures

In one aspect, the present invention relates to a receiver, comprising: a recovery circuit configured to recover an information signal from a channel; a channel parameter monitor configured to determine, directly or indirectly, a value for a channel parameter, the parameter having periodically recurring and/or time-dependant fluctuations; and logic configured to process the recovered information signal in a manner dependent on the parameter value. In various embodiments, the channel comprises a cyclostationary channel, and/or the time-dependant parameter fluctuation comprises a noise parameter, an energy parameter, a power parameter, or an attenuation parameter. In one implementation, the parameter comprises transmission energy.

Figure 7:
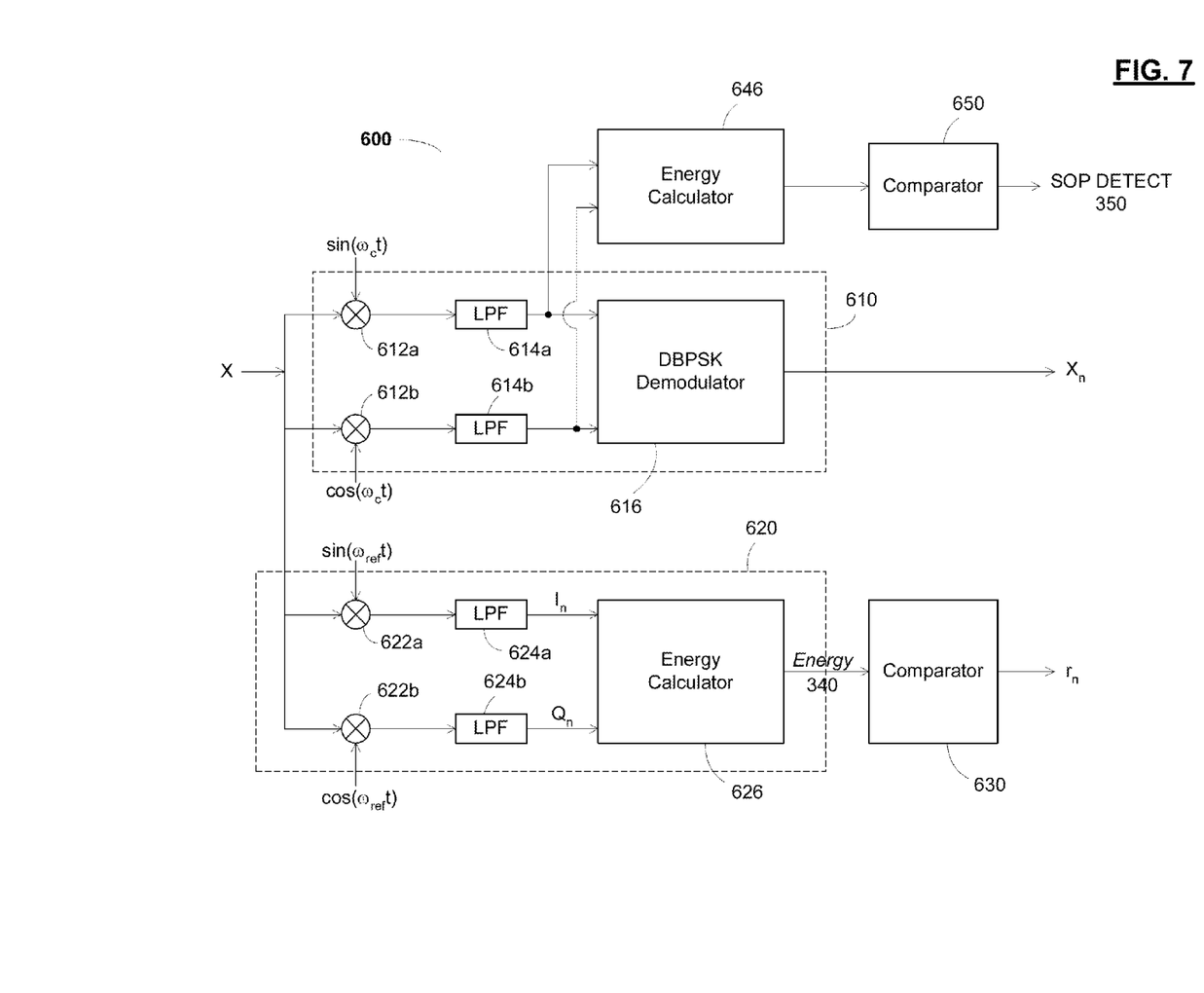
FIG. 7 is a box-level diagram showing a first embodiment of the present receiver circuitry.

FIG. 7 shows an exemplary receiver 600 according to the present invention, comprising recovery circuit 610, channel parameter monitor 620, and comparator 630. Both recovery circuit 610 and channel parameter monitor 620 receive information signal X as an input, along with certain orthogonal coefficient signals from the information input channel (or band) and the channel (or band) for which a time-dependent parameter is being monitored. Recovery circuit 610 and channel parameter monitor 620 respectively provide demodulated (digital) information signal $X_a$ and parameter instability signal $r_a$ as outputs (also see FIG. 6 for exemplary $X_a$ and $r_a$ waveforms).

For example, recovery circuit 610 may receive orthogonal and/or complementary phase coefficient signals $\sin(\omega_c t)$ and $\cos(\omega_c t)$ from the information input channel or band, and channel parameter monitor 620 receives orthogonal and/or complementary transmission energy (or power) coefficient signals $\sin(\omega_{ref} t)$ and $\cos(\omega_{ref} t)$ from the reference channel or band. Thus, the present receiver may receive inputs from (i) first and second cyclostationary channels of a common medium, or (ii) first and second bands of a common cyclostationary channel. In the former case, the first and second cyclostationary channels are generally structurally and/or functionally the same, and in the latter case, the first and second bands have different first and second frequencies or frequency ranges, respectively. Of course, the transmission energy coefficient signals can be obtained from the information input channel or band, using inputs and logic that are well within the level of one skilled in the art (e.g., by monitoring total transmission energy in the information input channel or band, and subtracting the information signal energy or strength therefrom).

The recovery circuit 610 may comprise conventional mathematical operator circuits or logic 612a-612b, filters 614a-614b, and demodulator 616. Mathematical operator circuits 612a-612b may comprise first and second multipliers (shown), or any mathematically equivalent circuit or logic. Mathematical operator circuits 612a-612b are generally configured to (i) receive the information signal and at least one reference signal (e.g., phase and/or transmission energy coefficient signals), and (ii) provide a down converted signal to the filter. Filters 614a-614b may comprise first and second low pass filters, although one may use any circuit or device providing the same or an equivalent function. In general, filters 614a-614b are configured to receive the information signal (or a modulated information signal) and provide a filtered information signal to the demodulator 616. In various embodiments, the demodulator 616 comprises a phase shift keying (PSK) demodulator, such as a differential binary PSK demodulator (shown in FIG. 7) or a quadrature PSK demodulator, although in certain applications (depending on the signal modulation technique being used) one may employ a frequency shift keying (FSK) demodulator or a quadrature amplitude demodulator. Although circuitry for processing a differential information signal X is shown, the circuitry can be adapted to process a single-ended information signal (in which case, a single mathematical operator and a single filter can be used). Similarly, the PSK demodulator can also be coherent or non-coherent, and/or multiphase instead of binary, depending on the nature of the received information signal and/or the signal modulation technique(s) being used.

The channel parameter monitor 620 may comprise conventional mathematical operator circuits or logic 622a-622b, filters 624a-624b, and energy calculator 626. In the exemplary embodiment of FIG. 7, the channel parameter monitor (i) receives an input from a second channel or band substantially similar to the transmission channel or band (i.e., from which the information signal is received), and (ii) determines the parameter value of the second channel directly (generally in order to indirectly determine a value for the transmission channel or band). Mathematical operator circuits 622a-622b and filters 624a-624b may be substantially identical in structure and/or function to the mathematical operator circuits 612a-612b and filters 614a-614b in recovery circuit 610. In the channel parameter monitor case, however, the mathematical operator circuit is generally configured to provide a down converted signal or a modulated parameter instability signal to the filter, and the filter is generally configured to provide a filtered information signal (e.g., $I_n$ or $Q_n$) to the energy calculator. Energy calculator 626 is generally configured to receive one or more filtered signals from filters 614a-614b and provide an analog or multibit digital parameter value signal (e.g., Energy signal 340 in FIG. 4) in response thereto. In one embodiment, energy calculator 626 calculates a channel energy signal value according to the equation:

$$\text{Energy} = \Sigma(I_n^2 + Q_n^2) \quad (1)$$

where the sums are taken over a moving window of samples (e.g., using a sample size of from 1 to $2^n$, 2 to 16, 3 to 8, and in one implementation, 4 samples) to provide a moving average energy in the sampled channel, although the invention is certainly not limited to this technique and/or circuitry for calculating channel energy.

In various embodiments of the receiver of FIG. 7, the logic configured to process the recovered information signal in a manner dependent on the parameter value includes comparator 630, which is generally configured to detect when the first parameter value exceeds a predetermined threshold and/or initiate or enable a function in response thereto. For example, the logic may be further configured to mark bits received from the first channel as unreliable when the first parameter value of the second channel exceeds a predetermined threshold (e.g., using noise marking [or parameter instability] signal $r_a$).

Similarly, energy calculator 646 (which receives inputs from filters 614a-614b in transmission channel 610) and comparator 650 (which receives an output signal from energy calculator 646) may be configured to (i) initiate a search for a control sequence in the information signal when the first parameter value exceeds a predetermined threshold (e.g., by asserting an active "SOP DETECT" signal 350); (ii) mark bits received from the first channel as unreliable when the first parameter value exceeds a predetermined threshold; and/or (iii) carry out one or more of the searching, detecting, matching, determining, comparing and/or calculating steps described with regard to identifying the control sequence in the present method of receiving information. Energy calculator 646 and comparator 650 may be very similar to energy calculator 626 and comparator 630 in structure and/or function.

Alternatively, the present receiver may comprise means for recovering an information signal from a channel; means for directly or indirectly determining a value for a parameter of the channel, the parameter having time-dependant fluctuations; and means for processing the recovered information signal in a manner dependent on the parameter value. The means for recovering may comprise a means for modulating the information signal, a means for filtering the modulated information signal, and/or a means for demodulating the filtered, modulated information signal. The means for processing may comprise a means for detecting when the parameter value exceeds a predetermined threshold, a means for identifying a control sequence in the information signal when the parameter value exceeds a predetermined threshold, a means for marking bits received from the channel as unreliable when the parameter value exceeds a predetermined threshold, and/or a means for marking bits received from the transmission channel as unreliable when the parameter value of a second channel exceeds a predetermined threshold.

The means for directly or indirectly determining generally comprises a means for comparing the parameter value to a threshold or reference value, and may further comprise a means for calculating the first parameter value. In further embodiments, the means for directly or indirectly determining further comprises (i) a means for filtering the information signal (which may be configured to provide a filtered information signal to the means for calculating), (ii) a means for receiving an input from a second channel substantially similar to the transmission channel, (iii) a means for directly determining the parameter value of the second channel (to thereby indirectly determine a value for the same parameter in the transmission channel), and/or (iv) a means for modulating the information signal, configured to provide a modulated information signal to the means for filtering.

Figure 8:
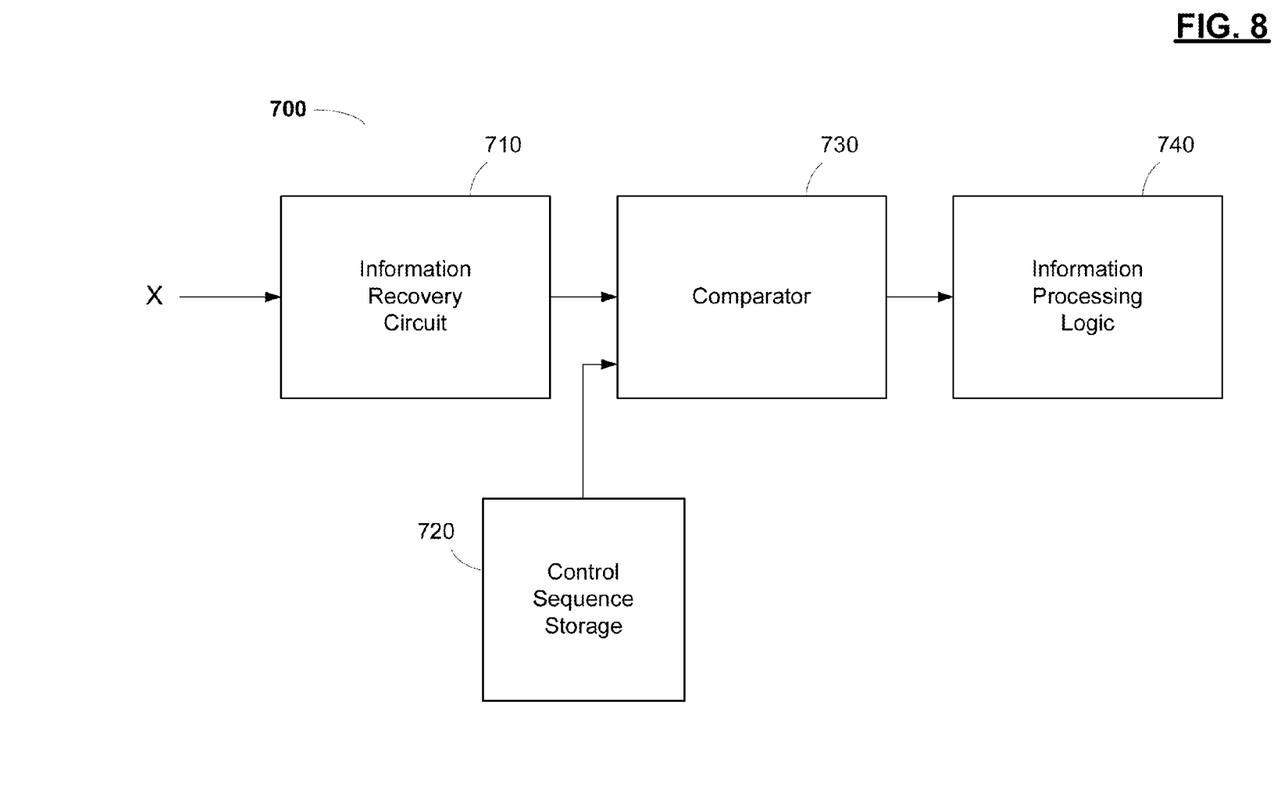
FIG. 8 is a box-level diagram showing a second embodiment of the present receiver.

In another aspect of the present invention, the present receiver may comprise: a recovery circuit configured to recover an information signal from a first channel having one or more time-dependant parameter fluctuations; a storage circuit configured to store a control sequence pattern comprising a plurality of interleaved sections; and logic configured to identify the control sequence pattern in the information signal. FIG. 8 shows a box-level diagram of an exemplary architecture for such a receiver, comprising information recovery circuit 710, control sequence storage circuit 720, comparator 730 and information processing logic 740. This receiver is particularly adapted for conducting the searching, determining, detecting, comparing and/or matching processes of the present method of receiving information described above.

Recovery circuit 710 may be substantially similar or identical (structurally and/or functionally) to recovery circuit 610 of FIG. 7. For example, as for the exemplary receiver of FIG. 7, the recovery circuit 710 in FIG. 8 may comprise a demodulator, such as a phase shift keying (PSK) demodulator (which may be differential or single ended), a filter (such as a low pass filter) configured to receive the information signal and provide a filtered information signal to the demodulator, and a mathematical operator circuit (such as a multiplier) configured to (i) receive the information signal and a reference signal, and (ii) provide a modulated information signal to the filter.

Control sequence storage circuit 720 is typically a memory, such as volatile memory (e.g., a DRAM array, an SRAM array, a set of flip-flops, one or more rows or banks of registers), nonvolatile memory (e.g., one or more rows or arrays of EPROM, EEPROM, flash or magnetic memory), or a combination thereof (e.g., a row or array of EPROM or flash memory for long-term storage that is written into a register bank during use of the receiver 700). Notably, control sequence storage circuit 720 may further store mask bits, representative of the interleaved information bits in the received information stream, that are generally ignored during comparison with the received information signal (e.g., that have a value equivalent to a "don't care" state in digital logic). The arrangement and/or sequence of control sequence sections and interleaved data segments is substantially as discussed above with respect to the present method(s).

The comparator 730 is generally configured to compare sequences from the received information signal to the control sequence stored in control sequence storage circuit 720. Comparator 730 may further include logic configured to perform the searching, determining, detecting, comparing and/or matching processes of the present method of receiving information described above. For example, comparator 730 may further include logic configured to compare the control sequence pattern with different bit positions in the recovered information and find or identify the position having the largest correlation (or the smallest Hamming distance).

Logic 740 is generally configured to perform functions on the recovered information signal, once the control sequence has been identified. For example, logic 740 may be configured to synchronize the block of information to a reference (e.g., as discussed above) after the control sequence is identified in the received information block.

Exemplary Transceivers, Systems and Networks

A further aspect of the invention relates to a transceiver, comprising the present receiver, and a transmitter in communication with the channel. Generally, the transmitter is configured to transmit information to a network comprising the channel. Alternatively, the transceiver comprises the present receiver and a means for transmitting information to the first channel.

Figure 9:
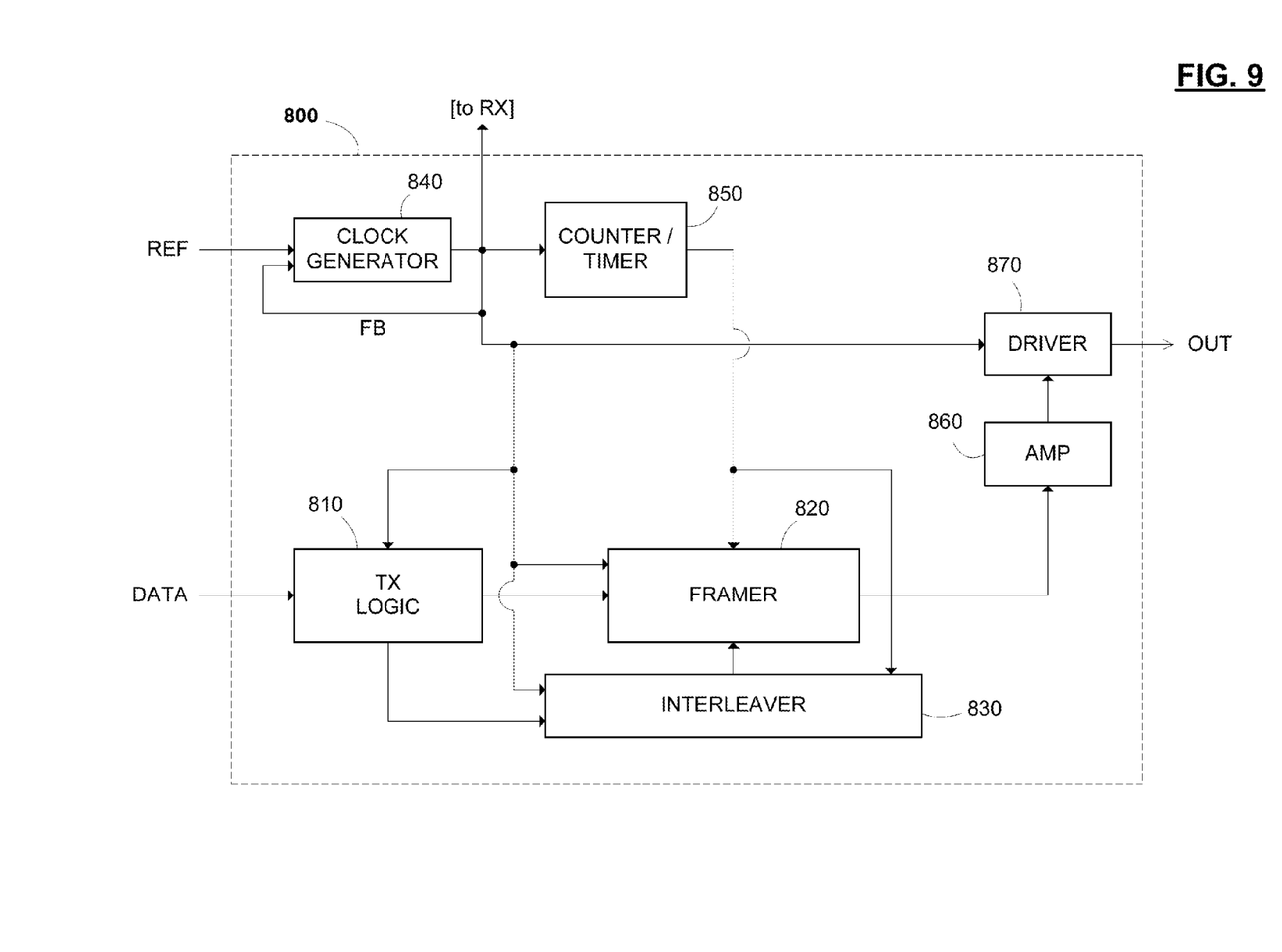
FIG. 9 is a box-level diagram showing an exemplary transmitter.

FIG. 9 shows an exemplary transmitter 800 suitable for use in conjunction with the present invention. Transmitter 800 may include transmitter logic 810, framer 820, interleaver 830, clock generator 840, counter 850, amplifier 860 and output driver 870. Without intending to be so limited, each of the circuit blocks 810-870 is generally conventional, and performs generally conventional functions associated with such circuits as understood by those skilled in the art. However, transmitter logic 810 generally receives a serial or parallel data stream DATA and performs certain functions on it, such as buffering and (if necessary) converting it into serial data for framer 820. Transmitter logic 810 is also generally configured to (i) identify one or more reference locations in the data stream and/or (ii) count and/or sample bits of the incoming data stream DATA, and communicate control information relating to data stream locations and/or lengths to interleaver 830, which uses such information to perform (or instruct framer 820 to perform) the functions described above with regard to the present method of transmitting information over a cyclostationary channel.

In one embodiment, interleaver 830 comprises a shift register comprising m rows each independently having a length of n bits (where each of n and m are as described above) configured to provide the control information to be interleaved to framer 820 in response to timing signals from a counter that, in the embodiment of FIG. 9, is internal to interleaver 830 and that receives a clock signal from clock generator 840. Alternatively, the timing signal for interleaver 830 to provide control sequence sections to framer 820 may be generated by transmitter logic 810 or counter I timer 850. Other than interleaving control sequences into the information to be transmitted over the channel, framer 820 is generally conventional and performs its conventional function (e.g., receiving a serial data stream from transmitter logic 810, a clock signal from clock generator 840, and one or more timing signals from counter I timer block 850, and adding control information as described above in a conventional frame or data packet format for serial transmission to amplifier 860).

The receiver and/or transceiver in the present system and/or network may further comprise a conventional clock (recovery) circuit, configured to provide a conventional clock signal to the transmitter and the receiver (or recover a clock signal from the received information), and/or other circuitry conventionally associated with a data receiver. For example, the transceiver may further comprise a phase locked loop configured to provide a reference clock signal to the transmitter and receiver. In further embodiments, the transceiver may be configured to convert serial information from the network to parallel information (e.g., data) for a device, and/or convert parallel data from the device to serial data for the network.

In one embodiment, the transceiver is embodied on a single integrated circuit. Thus, when the system comprises a single-chip transceiver, the system may further comprise an internal transmitter (i.e., on the same chip as the present receiver) communicatively coupled to (i.e., physically and/or electronically associated with) the present receiver, configured to transmit information (e.g., serial data) to the network. The system may also further comprise at least one receiver port external to the receiver and/or transceiver, communicatively coupled to the internal transmitter for receiving the information transmitted therefrom.

In a further aspect, the present invention concerns a system for transferring information on or across a network, comprising the present transceiver (described above) and at least one additional transmitter for transmitting the information signal, wherein the additional transmitter is external to the transceiver. The system may further comprise a second receiver in communication with (and which may be communicatively coupled to) the transceiver, configured to receive information from the channel.

Figure 10:
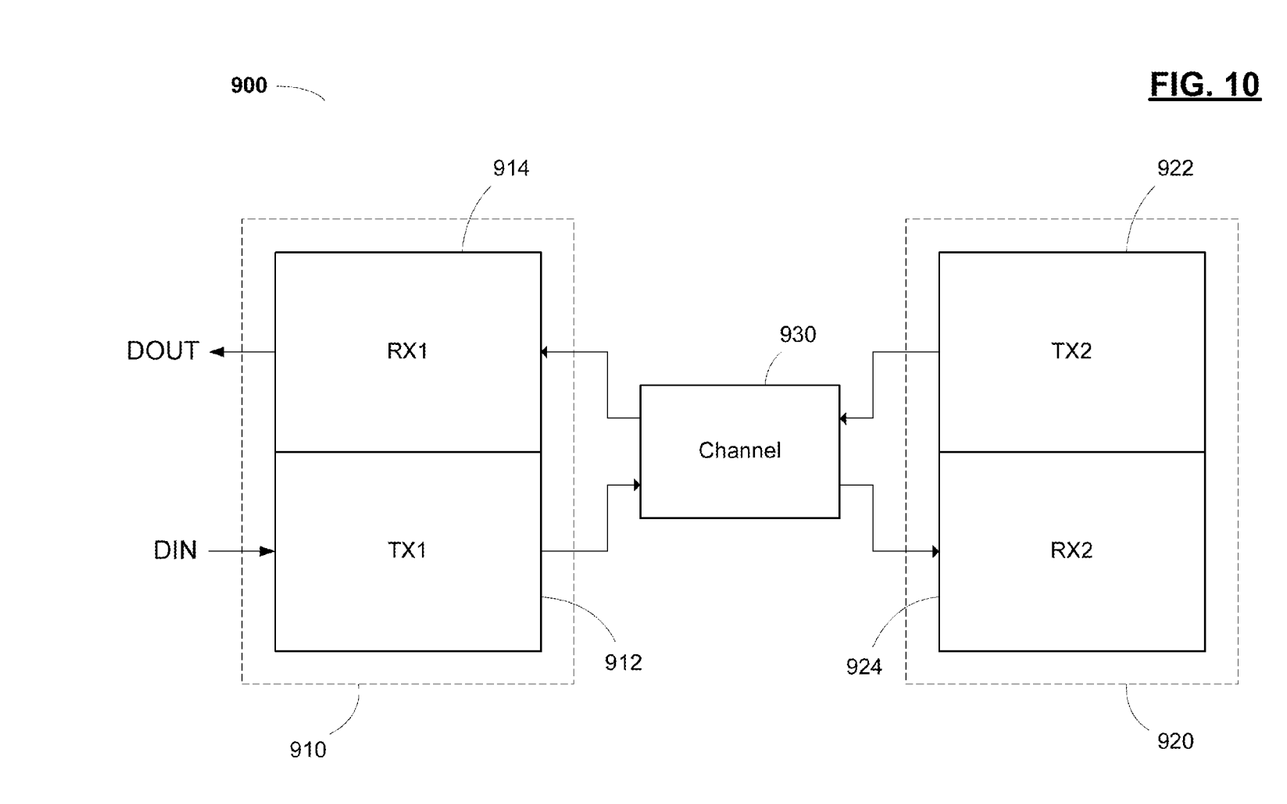
FIG. 10 is a diagram showing an exemplary communication system.

FIG. 10 shows an exemplary system 900, including first and second transceivers 910 and 920 and channel 930. Transceiver 910 includes first transmitter TX1 912 and first receiver RX1 914, and transceiver 920 includes second transmitter TX2 922 and second receiver RX2 924. Transmitters 912 and 922 may be exemplified by transmitter 800 of FIG. 9, and receivers 914 and 924 may be exemplified by receivers 600 and/or 700 of FIGS. 7-8. Channel 930 typically comprises a cyclostationary channel. Generally, transmitter TX1 912 transmits information over channel 930 to receiver RX2 924 (and any other receiver that may be in communication with channel 930), and transmitter TX2 922 transmits information over channel 930 to receiver RX1 914 (and any other receiver that may be in communication with channel 930).

In a further aspect, the present invention concerns a network, comprising a plurality of the present systems (described above), in electromagnetic communication with each other, and a plurality of storage, information processing or communications devices (or, alternatively, means for storing, processing or further communicating the information signal). Generally, each of the storage, information processing or communications devices are in electromagnetic communication with (and may be communicatively coupled to) one of the systems.

The network may be any kind of known network using a cyclostationary channel, such as a storage network (e.g., RAID array), powerline network, or home network. Furthermore, the network may include any known storage or communications device, but preferably, at least a plurality of the coupled devices comprise powerline communications and/or storage devices, such as a personal computer, telephone, television, media recorder and/or player (such as a DVD player, a CD player), etc.

CONCLUSION/SUMMARY

Thus, the present invention provides a circuit, architecture, method, algorithm, software and system for improving or increasing the reliability of data communications using time diversity coding. This technique is particularly useful in cyclostationary channels, where certain data communications parameters (such as noise and/or power parameters) have time-dependent or periodic variations in value. By associating a reliability factor with each copy of the communicated data received during a time period when a channel parameter has a time-dependant parameter that may affect data reliability, intelligent time diversity coding provides an increased probability that the communicated data is accurate and/or reliable.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of receiving and processing a block of information over a first channel, the first channel having at least one of periodically recurring fluctuations and time-dependent parameter fluctuations, the method comprising:
   receiving, with circuitry, the block of information from the first channel, the block of information comprising a plurality of sections of a control sequence interleaved with data segments;
   identifying the plurality of sections of the interleaved control sequence; and
   processing the data segments in the block of information based on the identified interleaved control sequence sections.

2. The method of claim 1, wherein the block of information further comprises a packet or frame comprising at least one of preamble, a synchronization mark, and a terminal information portion.

3. The method of claim 1, wherein the control sequence comprises control sequence segment sections interleaved with the data segments.

4. The method of claim 1, wherein the control sequence comprises a synchronization mark, the method further comprising:
   identifying the synchronization mark; and
   synchronizing a first bit of the block of information to a predetermined reference.

5. The method of claim 1, further comprising comparing a transmission energy from the first channel with a predetermined threshold energy to identify the plurality of sections of the interleaved control sequence.

6. The method of claim 1, wherein the identifying is based on comparing a transmission energy from a second channel with a predetermined threshold energy, the second channel (i) being proximate to the first channel and (ii) having at least one of substantially similar periodically recurring fluctuations and a substantially similar time-dependent parameter fluctuations to those of the first channel.

7. The method of claim 6, further comprising marking bits received from the first channel as unreliable when the transmission energy from the second channel exceeds the predetermined threshold energy.

8. The method of claim 1, wherein the first channel comprises a cyclostationary channel.

9. A non-transitory computer-readable medium comprising computer-executable instructions tangibly stored thereon which, when executed by a processing device configured to execute the computer-readable instructions, is adapted to perform the method of claim 1.

10. A receiver, comprising:
- a recovery circuit configured to recover an information signal from a cyclostationary channel, wherein the information signal comprises a plurality of sections of a control sequence interleaved with data segments;
- a channel parameter monitor configured to receive the information signal and determine, directly or indirectly, a value for a parameter of the cyclostationary channel, the parameter having at least one of periodically recurring fluctuations and time-dependent parameter fluctuations; and
- logic configured to process the recovered information signal in a manner dependent on the parameter value.

11. The receiver of claim 10, wherein the at least one of the periodically recurring fluctuations and the time-dependent parameter fluctuations comprises a noise parameter, an energy parameter, a power parameter, or an attenuation parameter.

12. The receiver of claim 10, wherein the recovery circuit comprises a demodulator.

13. The receiver of claim 12, wherein the recovery circuit further comprises a filter configured to receive the information signal and provide a filtered information signal to the demodulator.

14. The receiver of claim 10, wherein the logic is further configured to detect when the parameter value exceeds a predetermined threshold.

15. A transceiver, comprising:
- the receiver of claim 10; and
- a first transmitter in communication with the cyclostationary channel, configured to transmit information to a network comprising the cyclostationary channel.

16. The transceiver of claim 15, further comprising a clock generator configured to provide a reference clock signal to the first transmitter and the receiver.

17. A system for transferring information on or across the network, comprising:
- the transceiver of claim 15; and
- a second transmitter configured to transmit the information signal, wherein the second transmitter is external to the transceiver.

* * * * *